United States Patent [19]

Ikahata et al.

[11] Patent Number: 4,746,999
[45] Date of Patent: May 24, 1988

[54] EJECT MECHANISM FOR CASSETTE PLAYER

[75] Inventors: Toshihiro Ikahata; Satoshi Takagi; Hideki Hayashi; Masahiro Uno, all of Tokyo, Japan

[73] Assignee: Clarion Co., Ltd., Tokyo, Japan

[21] Appl. No.: 843,065

[22] Filed: Mar. 24, 1986

[30] Foreign Application Priority Data

Mar. 25, 1985 [JP] Japan .................................. 60-58549
Mar. 25, 1985 [JP] Japan .................................. 60-58550
Mar. 29, 1985 [JP] Japan .................................. 60-63436

[51] Int. Cl.$^4$ ...................... G11B 15/00; G11B 21/02
[52] U.S. Cl. ..................... 360/96.5; 360/93; 360/96.1
[58] Field of Search .................. 360/93, 96.1–96.6, 360/90, 71

[56] References Cited

U.S. PATENT DOCUMENTS

| 4,374,401 | 2/1983 | Takai | 360/96.5 |
| 4,586,096 | 4/1986 | Okada | 360/96.5 X |
| 4,672,478 | 6/1987 | Takai et al. | 360/93 |

Primary Examiner—John H. Wolff
Assistant Examiner—Alfonso Garcia
Attorney, Agent, or Firm—Russell E. Hattis; Stephen R. Arnold

[57] ABSTRACT

An eject mechanism for ejecting automatically the tape cassette in a tape player, in which one of two switching gears disposed on both the sides of a gear plate and engaging with a forward/backward rotating gear is selectively engaged with an intermittent gear by said forward/backward rotating gear and said intermittent gear drives the driven mechanism for the eject operation, said intermittent gear being so constructed that it is locked only in the forward rotational direction.

10 Claims, 5 Drawing Sheets

FIG. 6A
FIG. 6B
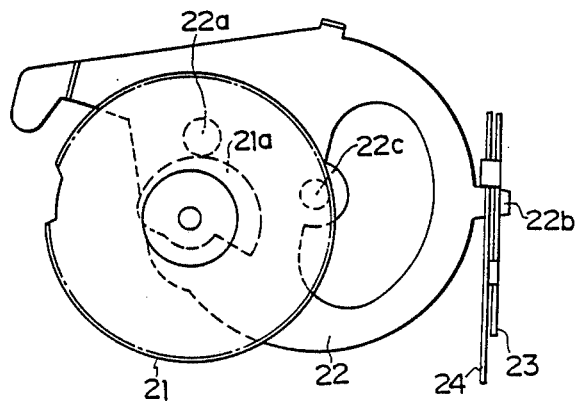
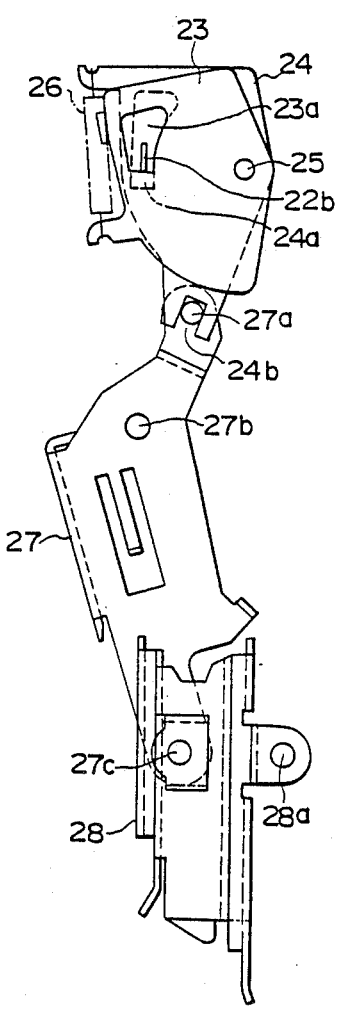

EJECT MECHANISM FOR CASSETTE PLAYER

FIELD OF THE INVENTION

This invention relates to an eject mechanism for ejecting the tape cassette in a tape player.

BACKGROUND OF THE INVENTION

In prior art auto-eject mechanisms an eject operation is triggered by attracting a plunger, etc. and a gear is linked with a driving means only when the attraction of the plunger is transmitted through a link to the gear. Then this gear is rotated by the driving force of the driving means and a driven mechanism is actuated in this way to effect the eject operation.

However, in the case where a plunger and a link are used as starting elements for the triggering operation as described above, the mechanism is complicated and cannot satisfy the requirements of miniaturization and simplification of the tape player. Further, since complication of the mechanism leads to lowering of reliability, this also gives rise to a problem.

OBJECT OF THE INVENTION

This invention is proposed in order to remove the drawbacks mentioned above of the prior art techniques, and its object is to provide an eject mechanism, in which the mechanism is simplified so that the number of parts is reduced, and thus the reliability of its eject operation is increased by constructing it so as to be able to trigger the eject operation without using a plunger and link.

SUMMARY OF THE INVENTION

An eject mechanism is characterized in that (a) a forward/backward rotating gear movable either forward or backward by means of a switching means for switching the rotational direction;

(b) a gear plate is supported pivotally on the axis of this forward/backward rotating gear and a friction means for energizing the gear plate in the rotational direction of the forward/backward rotating gear is disposed between the gear plate and the axis of the forward/backward rotating gear;

(c) two switching gears are supported pivotally at both the sides of the gear plate and both of these two switching gears are engaged with the forward/backward rotating gear so that they rotate in the directions opposite to each other;

(d) an intermittent gear is disposed, which rotates in the forward direction by engaging either one of these two switching gears and effects the eject operation by driving a driven mechanism, when it rotates in the forward direction;

(e) a locking portion and a partly cut-off rotating plate are formed on this intermittent gear;

(f) a locking means is disposed, which locks this locking portion only in the forward direction; and (g) an energizing means is disposed between the partly cut-off rotating means and the locking means described above.

By constructing the mechanism as described above, when the forward/backward rotating gear rotates normally in the forward direction, the gear plate rotates also in the forward direction. On the other hand, when the switching gear is in the intermitted portion of the intermittent gear, the locking portion of the intermittent gear is locked by the locking means and the intermittent gear is in the stop state. In this state, when the direction of the drive is reversed, the gear plate is rotated in the backward direction and the switching gear, which is on the side opposite to that in the case of the forward rotation, is engaged with the intermittent gear. Consequently the intermittent gear rotates once in the backward direction and the locking is released by a release means, which triggers the eject operation. That is, when the rotational direction is reversed again to the forward direction in this state, the intermittent gear, which is then in the free state, begins to rotate and the eject operation is started.

BRIEF DESCRIPTION OF THE DRAWINGS

FIGS. 6 (A) and (B) are a plan view and a side view, respectively, showing the state, in which the pack guide is fixed and the eject operation is being effected, of the same embodiment.

DETAILED DESCRIPTION

Figure 1:
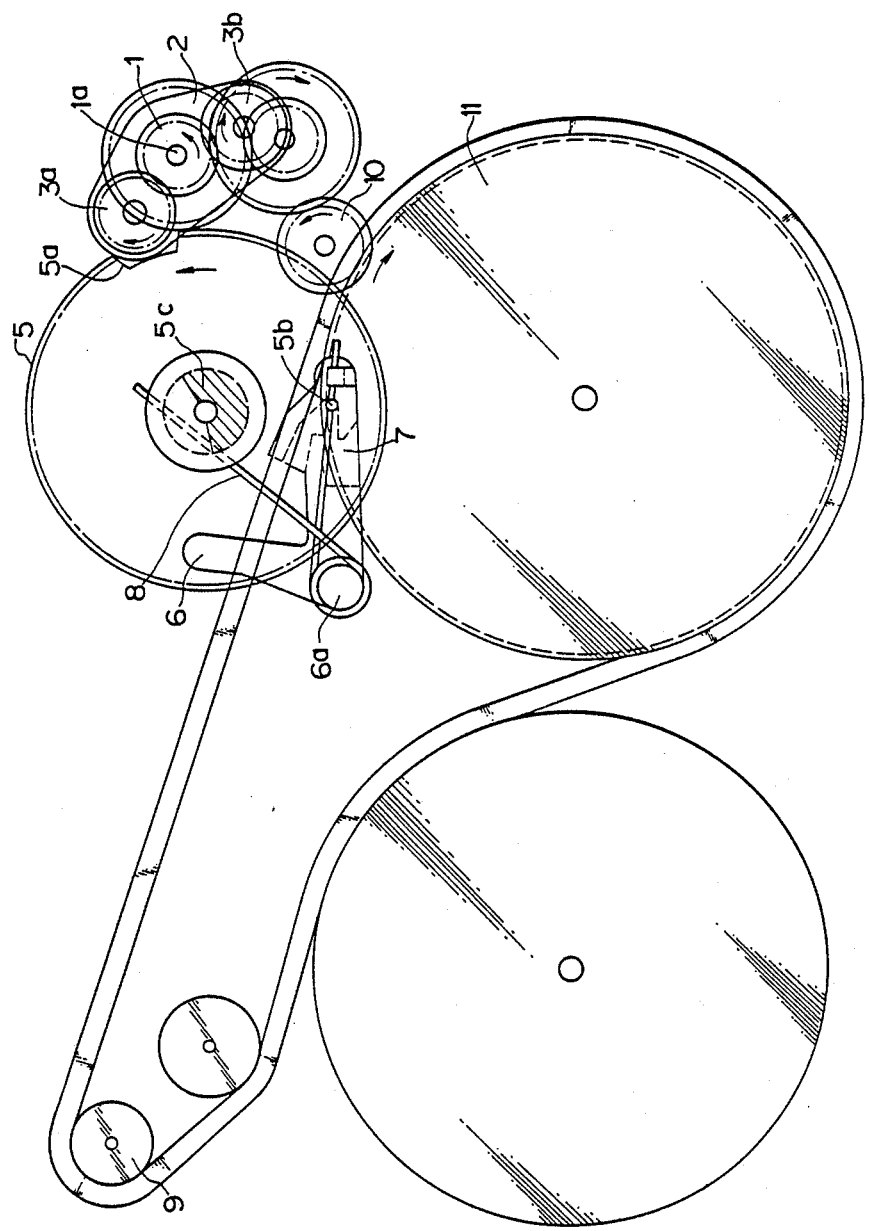
FIGS. 1 to 3 are plan views showing an embodiment of the eject mechanism according to this invention, FIG. 1 illustrating the normal mode state, FIG. 2 the state, in which the intermittent gear is reversed by an eject command, FIG. 3 the state, in which an eject operation is started.

Hereinbelow an embodiment of the auto-eject mechanism according to this invention, as described above, will be explained concretely, referring to the drawings.

Figure 4:
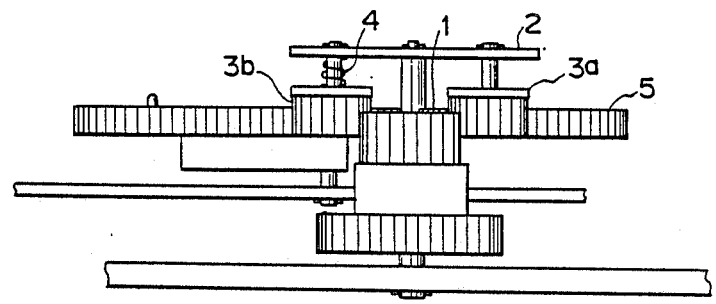
FIG. 4 is a side view indicating the arrangement of the gears and the gear plate.

FIG. 1 shows a gear driving mechanism portion of an auto-eject mechanism according to this invention in the normal forward rotation state. In FIG. 1 a forward/backward rotating gear 1 is so disposed that it is driven by a forward/backward rotating motor pulley 9. A gear plate 2 is supported pivotably by the axis 1a of the forward/backward rotating gear 1. On both the sides of the gear plate 2 are supported pivotably switching gears 3a and 3b, respectively, each of which is engaged with the forward/backward rotating gear 1. Further a compresssion spring 4 is disposed, as indicated in FIG. 4, as a friction means energizing the gear plate 2 in the rotational direction of the forward/backward rotating gear 1, between one of the switching gears 3b and the gear plate 2.

An intermittent gear 5 has a cut-off portion 5a fitted to the size of the switching gears 3a and 3b, a lock pin 5b, which serves as a locking portion, and a partly cut-off rotating plate 5c. The intermittent gear is rotated forward or backward by engaging with either one of the switching gears 3a and 3b and it is also constructed that it drives a driven mechanism, which will be described later, to effect an eject operation, when it rotates forward. Further a lock link 6, which is rotatable around an axis 6a, is disposed as a locking means for the intermittent gear 5, on one surface of which a V-shaped ditch 7 is formed so that a lock pin 5b can move therein. In addition, a torsion spring 8 is so disposed between the partly cut-off rotating plate 5c of the intermittent gear 5 and the lock link 6 that it energizes both of them. At the forward rotation indicated in FIG. 1, the intermittent gear 5 is going to rotate to the forward rotational direction (counterclockwise in the figure) by this energizing force. To the contrary, since the lock link is energized in the direction opposite thereto, the lock pin 5b is in the state, in which it is locked by a corner portion of the ditch 7 of the lock link 6. Further the reference numeral 10 in the figure represents an idler gear, which is so constructed that it is engaged with a flywheel 11, only when the head plate is retreated.

Next, the working mode of the gear driving mechanism will be explained below. At first, in a cassette tape player, in the play mode, the fast forward mode and the rewinding mode, etc., in which a head plate (not shown in the figures) is at its advanced position, the idler gear 10 is separated from the flywheel 11, and thus no rotational movement is transmitted to the forward/backward rotating gear 1. To the contrary, in the stop mode, in which the head plate is at its retreated position, the idler gear 10 engages with the flywheel 11 and the forward/backward rotating gear 1 rotates forward (counterclockwise in the figure), and at this moment the gear plate 2 is rotated by the compression spring 4 to the forward side (counterclockwise in the figure), as indicated in FIG. 1. At this time the intermittent gear 5 is locked to the lock link 6, as indicated above, and in addition the switching gear 3a moved to the side where it engages with the intermittent gear 5, depending on the position of the gear plate 2, is opposed to the intermittent portion 5a of the intermittent gear 5.

Figure 2:
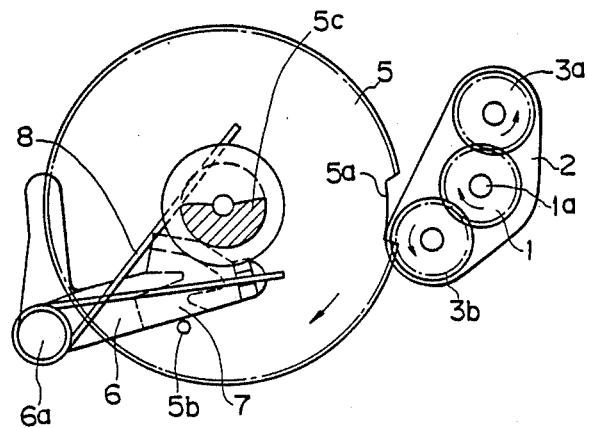

In this state, when an eject command is received, the rotational direction of the motor pulley 9 is reversed, and the forward/backward rotating gear 1 is also reversed (clockwise in the figure), as indicated in FIG. 2. Then, the gear plate 2 rotates to the backward side (clockwise in the figure), and the switching gear 3b other than that engaged with the intermittent gear 5 during the forward rotation engages therewith. As the result the intermittent gear 5 rotates to the backward side, i.e., counterclockwise and the lock pin 5b moves along the ditch 7 of the lock link 6. At this time, since the lock link 6 is energized by a torsion spring 8 counterclockwise in the figure, when the lock pin 5b reaches a retreat portion of the ditch 7, the lock link 6 is made to come to the inside, i.e., upward, and thus the lock pin 5b is withdrawn from the ditch 7. However, after a short time the intermittent gear 5 stops at the position where its intermittent portion 5a is opposed to the switching gear 3b.

Figure 3:
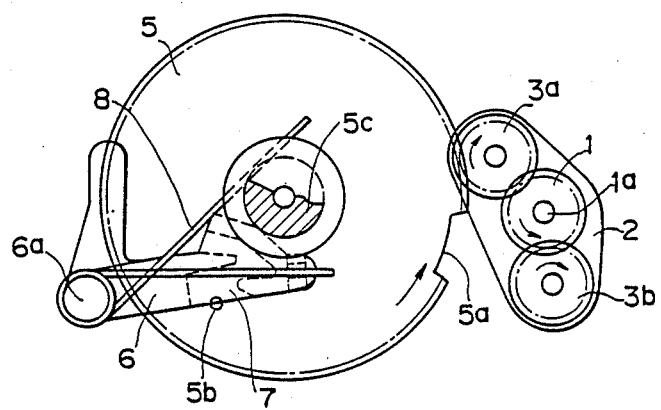

Then, at this state, the motor returns to the forward rotation and the state indicated in FIG. 3 is established. In FIG. 3 the lock link 6 remains inside. In addition, since the switching gear 3a is engaged with the intermittent gear 5 by the fact that the gear plate 2 is rotated to the forward side, the intermittent gear 5 rotates forward (counterclockwise in the figure) and thus drives the driven mechanism to the eject state. After the intermittent gear 5 has made one round, the lock pin 5b enters the ditch 7 of the lock link 6 and is brought to stop by its corner portion. Further, since the intermittent portion 5a is now opposed to the switching gear 3a, the intermittent gear 5 stops in the state indicated in FIG. 1.

In this way, in the gear driving mechanism described above, since the initiation of the eject operation is effected only by the lock link and other simple elements utilizing the reversal of the motor, the construction is simplified and the number of parts is reduced or compared to those in the case where a plunger and a link are used in the prior art. Further the simplification of the construction leads to improvement of the reliability of the eject operation.

This invention is not restricted to the example described above. For example, the construction around the locking means, whose principal element is a lock link, is not limited to a combination of a lock pin and a ditch, but other means whose engaging projection stops the lock pin, and so forth, can be used likewise. In addition, for the friction means for rotating the gear plate in the rotational direction of the forward/backward rotating gear, instead of disposing a compression spring, a means for inserting a piece made of synthetic resin can be used.

Now the driven mechanism for the eject operation, which is driven by the gear drive mechanism constituting a part of the eject mechanism according to this invention, will be explained more concretely, referring to FIGS. 5 (A), 5 (B), 6 (A) and 6 (B).

Figures 5A, 5B:
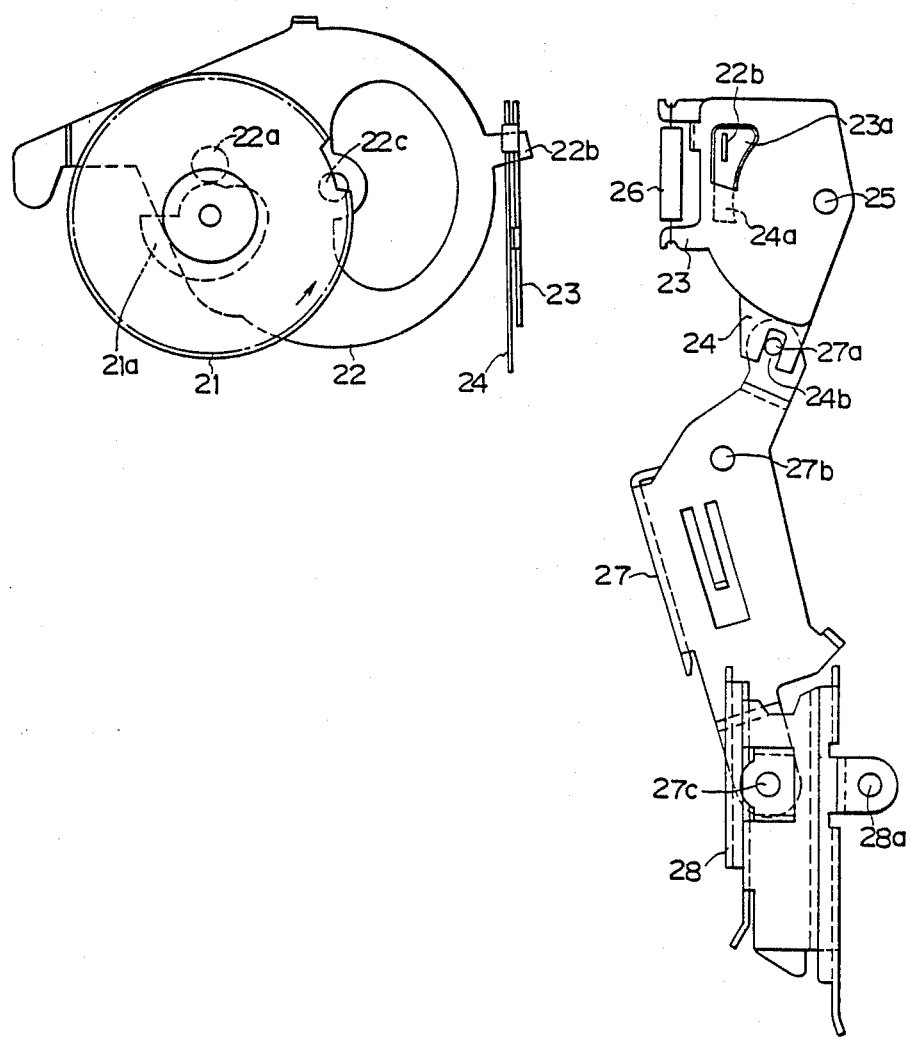
FIGS. 5 (A) and (B) are a plan view and a side view, respectively, showing eject mechanism before an eject operation.

In FIG. 5 (A) a cam gear 21 is driven directly or indirectly by the intermittent gear 5 stated above so as to rotate counterclockwise. This cam gear 21 is so constructed that when it makes a round, an eject operation is terminated. On an eject plate 22 are disposed a guide pin 22a engaging with a cam 21a of the cam gear 21 and an engaging projection 22b, which will be explained later, linked with an overplate 23 and they are so disposed that, when the cam gear 21 rotates, the eject plate 22 rotates clockwise in the figure around the axis 22c.

In FIG. 5 (B) the overplate 23 and a push plate 24 are superposed on each other and supported rotatably on a common axis 25. In both the plates 23 and 24 are formed holes 23a and 24a, respectively, at positions corresponding to each other, in which the engaging projection 22b of the eject plate 22 is inserted. The size of the hole 23a of the overplate 23 is determined so that, when the eject plate 22 rotates, its engaging projection 22b pushes the front end portion of the hole 23a and makes the overplate 23 rotate by a predetermined angle counterclockwise in the figure. On the other hand, the size of the hole 24a of the push plate 24 is determined so that its front end portion is prolonged and when the eject plate 22 rotates, its engaging projection 22b doesn't push its front end portion. In addition, between the overplate 23 and the push plate 24 is disposed a spring 26 energizing both the plates so that they are superposed on each other.

Figure 7:
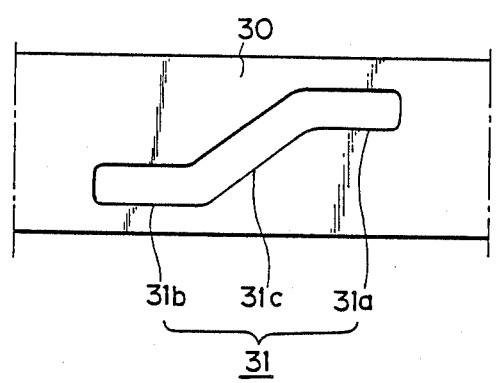
FIG. 7 is a plan view of a slide plate for raising the pack guide.

With the front end portion of the push plate 24 is linked a pack guide 28 through a guide arm 27. In this way, when the push plate 24 rotates counterclockwise, the guide arm 27 rotates clockwise around an axis 27b by the construction of an engaging ditch 24b of the push plate 24 and an engaging pin 27a of the guide arm 27, and the pack guide 28 supported pivotably by its front end portion 27c is raised upward (to the left in the figure). Further, the reference numeral 28a indicates an engaging pin inserted in a guide hole 31 of a well-known slide plate 30 of a cassette tape player, as indicated in FIG. 7, which guide hole 31 consists of an upper and a lower horizontal portion 31a and 31b, respectively and an inclined portion 11c for lifting the engaging pin 28a inserted therein. In a drive mechanism having the construction as described above, when an eject command is received, the cam gear 21 begins to rotate counterclockwise by the rotating drive of the motor and the eject plate 22 rotates clockwise by the action of its cam 21a. Then, since the engaging projection 22b of the eject plate 22 pushes the front end portion of the hole 23a of the overplate 23, the overplate 23 rotates counterclockwise. At this moment, since the push plate 24 is energized by the spring 26 so that it is superposed on the overplate 23, it rotates counterclockwise together with the overplate 23. As the result, the guide 28 is raised.

In the course of the eject operation described above, in the case where the pack guide 28 has been immobilized by some external force at the mode position indicated in FIG. 6 (B), the push plate 24 is secured through the guide arm 27. However, since the overplate 23 is linked only by the spring 26 with respect to the push plate 24, it is in the state where it is rotatable against the energizing force of the spring 26. In addition, since the engaging projection 22b of the eject plate 22 is not engaged with the push plate 24 in the region, within which it is movable, the eject plate 22 is not influenced by the fastening of the push plate 24, but continues further its movement. Consequently, the cam gear 21 continues further its rotation with the rotation of the motor, as indicated in FIG. 6 (A), and the eject plate 22 also rotates against the force of the spring 26 so that the overplate 23 is moved together. Then, just as for the usual operation, the cam gear makes a round and the eject operation is terminated.

That is, in the mechanism according to this invention, in the case where the pack guide has been immobilized in the course of an eject operation, its immobilization has no effect as far as the push plate 24. By this fact, on the driving mechanism side, the eject operation can be smoothly terminated without any influence of the immobilization. Consequently neither the mechanism nor the tape pack is damaged, contrary to the fact that they are sometimes damaged by the prior art techniques.

Further the mechanism according to this invention is not restricted to the embodiment described above, but for example the form and the arrangement of the push plate and the overplate can be selected arbitrarily. Furthermore the construction on the driving mechanism side of the gear, the eject plate, etc. and the construction of the linkage on the pack guide side can be modified freely.

As explained above, according to this invention, it is possible to obtain an eject mechanism, for which the construction is simplified and the number of parts is reduced by utilizing the backward rotation of the rotational drive, which can contribute to miniaturization and simplification of the cassette tape player and to improvement of the reliability. Further, owing to the simple constuction, in which the overplate and the push plate are coupled by an energizing means, even in the case where the tape pack and the pack guide have been immobilized in the course of an eject operation the driving mechanism side can terminate normally the eject operation for an eject mechanism, and there is no fear that either the mechanism or the tape pack is damaged.

The embodiment of the invention in which an exclusive property or privilege is claimed are defined as follows:

1. A cyclic actuator mechanism for a cassette tape player comprising:
    a forward/backward rotating gear rotatable either forward or backward according to the directional rotation of a rotational drive source coupled thereto;
    gear mounting means supported pivotally about the rotational axis of said forward/backward rotating gear;
    rotating means for urging said gear mounting means in the rotational direction of said forward/backward rotating gear;
    forward and reverse drive switching gears supported pivotally on said gear mounting means so that they are engaged with said forward/backward rotating gear;
    an intermittent gear having a gear portion for selectively engaging either one of said switching gears according to the angular position of said gear mounting means and having a cutaway portion configured for disengagement therefrom at an initial position of said intermittent gear when said forward drive switching gear is disposed for engagement therewith; and
    releasable locking means responsively coupled to the rotation of said intermittent gear and having associated therewith operating means for operating said locking means to an arresting condition by a terminal portion of the rotation of said intermittent gear so as to arrest the rotation of said intermittent gear at said initial position and operable to a releasing condition by a partial reverse rotation of said intermittent gear from said initial position and including means for maintaining said releasing condition throughout subsequent forward rotation until said intermittent gear again is rotated to said terminal portion of the movement thereof.

2. The mechanism of claim 1 wherein said locking means includes a pin eccentrically mounted on one face of said intermittent gear, a pivotally mounted locking member having a V-shaped channel of two branches therein, and first biasing means for urging said locking member to arrestingly capture said pin in one branch of said channel and to trap said pin in said second channel and thereafter disengage therefrom during said reverse rotation of said intermittent gear.

3. The mechanism of claim 2 wherein said first biasing means includes a first spring coupled to urge said locking member to trap said pin in said other channel.

4. The mechanism of claim 3 wherein said first biasing means includes a portion of said locking member configured to be cammingly engaged by said pin to urge said locking member against the force of said first spring to present said one branch of said channel to capture said pin.

5. The mechanism of claim 4 further including a cam formed on a face of said intermittent gear and second biasing means including a second spring coupled to said cam to urge said intermittent gear in said forward direction from said initial position.

6. The mechanism of claim 5 wherein said first spring and said second spring are a common spring coupled between said cam and said lock member to urge said lock member into contact with said cam.

7. The mechanism of claim 1 wherein said gear mounting means includes a plate pivotally supported about said rotational axis and carrying said switching gears thereon, and said rotating means includes a compression spring disposed between one of said switching gears and said plate.

8. The mechanism of claim 1 further including:
    a second cam coupled so as to be rotated by said intermittent gear;
    a pivotally supported eject plate having a follower portion urged into contact with said cam by a first elastic means so as to be reciprocatingly linked with said second cam; and a pack guide coupled to the rotation of said eject plate so as to be reciprocatingly lifted and lowered.

9. The mechanism of claim 8 further including:

a pivotally mounted overplate linked with said eject plate so as to be reciprocatingly rotatingly driven thereby; and a pivotally mounted push plate coupled to said overplate through a second elastic means to lift and lower said pack guide by the rotation of said push plate.

10. The mechanism of claim 9 in which said overplate and said push plate are confrontingly disposed on a common pivot and said elastic means includes a spring disposed between said two plates to couple the reciprocation of said overplate to reciprocatingly drive said push plate.

* * * * *